United States Patent [19]

Yamabe et al.

[11] 4,345,057
[45] Aug. 17, 1982

[54] CURABLE FLUOROCOPOLYMER

[75] Inventors: Masaaki Yamabe; Gen Kojima, both of Machida; Seitoku Kaya, Yokohama, all of Japan

[73] Assignee: Asahi Glass Company, Ltd., Tokyo, Japan

[21] Appl. No.: 283,239

[22] Filed: Jul. 14, 1981

[30] Foreign Application Priority Data

Aug. 8, 1980 [JP] Japan .................................. 55-108189

[51] Int. Cl.$^3$ ........................................... C08F 214/18
[52] U.S. Cl. .................................................. 526/247
[58] Field of Search .................... 526/247, 242, 255

[56] References Cited

U.S. PATENT DOCUMENTS

| | | | |
|---|---|---|---|
| 3,231,554 | 1/1966 | Kern | 526/255 |
| 3,429,845 | 2/1969 | Bechtold et al. | 526/255 |
| 4,151,340 | 4/1979 | Ichimura et al. | 526/255 |
| 4,230,843 | 10/1980 | Coleman | 526/255 |

*Primary Examiner*—Harry Wong, Jr.
*Attorney, Agent, or Firm*—Oblon, Fisher, Spivak, McClelland & Maier

[57] ABSTRACT

A curable fluorocopolymer comprises 40 to 60 mol % of fluoroolefin units, 5 to 45 mol % of cyclohexyl vinyl ether units, 5 to 45 mol % of alkyl vinyl ether units and 3 to 15 mol % of hydroxyalkyl vinyl ether units and has an inherent viscosity of 0.05 to 2.0 dl/g. in tetrahydrofuran at 30° C.

5 Claims, 1 Drawing Figure

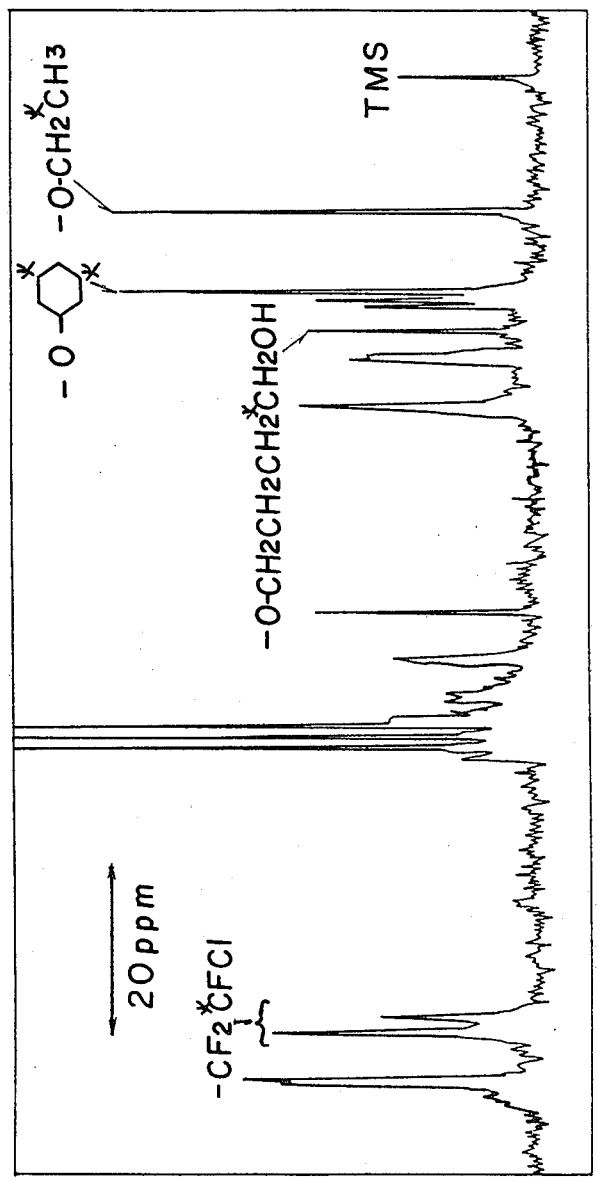

CURABLE FLUOROCOPOLYMER

BACKGROUND OF THE INVENTION

1. Field of the Invention

The present invention relates to a curable fluorocopolymer. More particularly, it relates to a curable fluorocopolymer which comprises specific contents of units of a fluoroolefin, a cyclohexyl vinyl ether, an alkyl vinyl ether, and a hydroxyalkyl vinyl ether.

2. Description of the Prior Art

It has been found that a copolymer of a fluoroolefin and cyclohexyl vinyl ether has properties useful as a resin for paint and moreover, has a special crosslinkability to easily crosslink by heating or irradiating UV light with short wave length in the presence of oxygen, and the crosslinkability is improved by an addition of a specific amount of an oil soluble manganese salt as shown in Japanese Unexamined Patent Publication No. 25414/1980.

It has been further studied to improve a curing property of a copolymer of a fluoroolefin, cyclohexyl vinyl ether and an alkyl vinyl ether having an improved flexibility especially as a resin for paint. As a result, it has been found that when the crosslinkability of such copolymer is utilized, a high temperature or a long term cure is required to bring the hardness of the finish to a practicable sufficient level. A mild curing condition causes unsatisfactory resistance of the finish against stain or adhesiveness to a substrate.

SUMMARY OF THE INVENTION

It is an object of the present invention to provide a copolymer having various advantageous characteristics and a remarkably improved curable property to be cured in a short time with a known curing agent such as melamine, and to be cured at room temperature with an isocyanate to form glossy finishes with high chemical resistance and excellent weatherability.

The foregoing and other objects of the present invention have been attained by incorporating hydroxyalkyl vinyl ether units as curing units in a copolymer of a fluoroolefin, cyclohexyl vinyl ether and an alkyl vinyl ether as a resin for paint of a fluoroolefin-cyclohexyl vinyl ether, alkyl vinyl ether type copolymer.

The present invention is to provide a curable fluorocopolymer of a fluoroolefin, a cyclohexyl vinyl ether, an alkyl vinyl ether and a hydroxyalkyl vinyl ether which comprises 40 to 60 mol % of fluoroolefin units, 5 to 45 mol % of cyclohexyl vinyl ether units, 5 to 45 mol % of alkyl vinyl ether units, 3 to 15 mol % of hydroxyalkyl vinyl ether units and 0 to 30 mol % of another comonomer units, and has an inherent viscosity of 0.05 to 2.0 dl/g. in tetrahydrofuran at 30° C.

BRIEF DESCRIPTION OF THE DRAWING

FIG. shows $^{13}$C-NMR spectrum of a four-component polymer of chlorotrifluoroethylene, cyclohexyl vinyl ether, ethyl vinyl ether and hydroxy vinyl ether.

DETAILED DESCRIPTION OF THE PREFERRED EMBODIMENTS

In the curable fluorocopolymer, it is important to comprise units of a fluoroolefin, cyclohexyl vinyl ether, an alkyl vinyl ether and hydroxyalkyl vinyl ether at ratios of 40 to 60 mol %, 5 to 45 mol %, 5 to 45 mol % and 3 to 15 mol % respectively, preferably 45 to 55 mol %, 10 to 30 mol %, 10 to 35 mol % and 5 to 13 mol %.

When the content of fluoroolefin units is too low, it is not advantageous in view of weatherability and producibility. When the content of fluoroolefin units is too high, it is not advantageous in view of producibility. On the other hand, when the content of cyclohexyl vinyl ether units is too low, hardness of the finish is disadvantageously low. When the content of alkyl vinyl ether units is too low, flexibility is disadvantageously low.

It is important for a copolymer of the present invention to contain hydroxyalkyl vinyl ether units in the above-mentioned ratio in view of an improvement in curability without deterioration of various useful characteristics as resin for paint. That is, when the content of hydroxyalkyl vinyl ether units is too high, the solubility of the copolymer is varied to be soluble in only specific solvents as alcohols. Therefore, applicability as a resin for solution type paint is limited. Moreover, a flexibility of the cured finish is reduced, and gelation time (pot life) of the copolymer in the presence of a curing agent is reduced to result in poor application properties as paint. When the content of hydroxyalkyl vinyl ether is too low, an effect for improving the curing property is lost to increase the curing time and to deteriorate the chemical resistance of the finish and the resistance of the finish against stain and to deteriorate adhesiveness to the substrate or a primer.

In the present invention, perhaloolefins especially chlorotrifluoroethylene or tetrafluoroethylene, are preferably used as the fluoroolefin, and alkyl vinyl ethers having a $C_2$–$C_8$ straight or branched alkyl group, especially a $C_2$–$C_4$ alkyl group are preferably used as the alkyl vinyl ethers. The fluoroolefin and the alkyl vinyl ether are not respectively limited to one kind but can be a mixture of two or more kinds.

The curable fluorocopolymer of the present invention can incorporate other comonomer units than the above-mentioned four indispensable monomer units, up to 30 mol %. Suitable other comonomers include olefins such as ethylene, propylene and isobutylene; haloolefins such as vinyl chloride and vinylidine chloride; unsaturated carboxylic acid esters such as methyl methacrylate and vinyl carboxylate such as vinyl acetate and vinyl n-butyrate. Comonomers are not limited to one kind but can be a mixture of two or more kinds.

The copolymer of the present invention has an inherent viscosity measured at 30° C. in tetrahydrofuran in the non-cured condition of 0.05 to 2.0 dl/g. preferably 0.10 to 1.0 dl/g. especially 0.15 to 0.8 dl/g. When the viscosity is too low, the mechanical strength is low, whereas when it is too high, the resin concentration in paint is obliged to be low in view of viscosity and the processability is inferior in the application as a resin for a solution type paint.

The copolymer of the present invention can be produced by a copolymerization of a mixture of monomers in specific ratios in the presence or absence of a polymerization medium by using a polymerization initiator source such as polymerization initiators or ionizable radiation.

The polymerization initiators can be water soluble or oil soluble depending upon the polymerization system or the polymerization medium. Suitable water soluble initiators include inorganic initiators, for example, persulfate such as potassium persulfate; hydrogen peroxide; and redox initiators as combination of said compounds and a reducing agent such as sodium hydrogen sulfite and sodium thiosulfate, and a mixture of these compounds with a small amount of iron, ferrous salt or silver nitrate; organic initiators, for example, dibasic acid peroxides such as disuccinic acid peroxide, diglutaric acid peroxide and monosuccinic acid peroxide and azobisisobutylamidine dibasic acid salts. The oil soluble initiators include peroxyester type peroxides such as t-butylperoxyisobutyrate and t-butylperoxyacetate; dialkylperoxydicarbonates such as diisopropylperoxydicarbonate; benzoylperoxide and azobisisobutyronitrile.

An amount of the polymerization initiator can be selected depending upon the kind and copolymerization condition, and is usually in a range of 0.005 to 5 wt. %, especially 0.05 to 0.5 wt. % based on total monomers for the copolymerization.

A reaction system in said copolymerization is not critical and can be a bulk polymerization, a suspension polymerization, an emulsion polymerization and a solution polymerization. In view of the stability of the polymerization reaction and the easy separation of the resulting copolymer, it is preferable to employ the emulsion polymerization in an aqueous medium or the solution polymerization using a solvent such as alcohols as t-butanol, esters and saturated halohydrocarbons having at least one fluorine atom.

When the copolymerization is carried out in an aqueous medium, it is preferable to add a basic buffering agent and to maintain the pH of the solution, at least 4, preferably at least 6, during the copolymerization. In the case of the solution polymerization, it is also effective to add a basic material. The process of the present invention is attained by a batch system, a semicontinuous system and a continuous system. In the copolymerization, the temperature for the copolymerization is in a range of $-30°$ C. to $+150°$ C. and the optimum value is selected depending upon the kind of polymerization initiator and polymerization medium. When the copolymerization is carried out in an aqueous medium, it is usually in a range of 0° to 100° C., preferably about 10° to 90° C. A reaction pressure can be selected and preferably in a range of 1 to 100 kg/cm$^2$, especially 2 to 50 kg/cm$^2$.

In order to control the inherent viscosity of the resulting copolymer in said range, it is possible to perform the copolymerization in the presence of a suitable chain transfer agent.

The copolymer of the present invention has hydroxyl groups derived from the hydroxylalkyl vinyl ether units and is curable with a curative such as melamine resin curatives, urea resin curatives and polybasic acid curatives. The melamine resin curatives include butylated melamine resin, methylated melamine resin and epoxymelamine resin. The melamine resin curatives having degrees of modification ranging from 0 to 6 can be used depending upon the application. A degree of self-condensation can be selected as desired. The urea resin curatives include methylated urea and butylated urea. The polybasic acid curatives include long chain aliphatic dicarboxylic acids, aromatic polycarboxylic acids or anhydrides thereof, and blocked polyisocyanates. In the use of melamine resin curatives or the urea resin curatives, it is possible to accelerate the curing with an acidic catalyst.

The copolymer of the present invention can be cured at room temperature with a polyisocyanate. Non-discoloring diisocyanates such as hexamethylenediisocyanate and isohoronediisocyanate and adducts thereof, are especially effective as the polyisocyanate. When the curing is carried out at room temperature with an isocyanate, the curing can be accelerated by an addition of a known catalyst such as dibutyl tin dilaurate.

In the preparation of a solution type paint with the copolymer of the present invention, various solvents can be used. The solvents include aromatic hydrocarbons such as xylene and toluene; alcohols such as n-butanol; esters such as butyl acetate; ketones such as methyl isobutyl ketone, and glycol ethers such as ethyl cellusolve and various commercial thinners.

In the process for mixing the copolymer with the solvent, it is possible to employ various conventional apparatuses used in the preparation of paints such as a ball mill, a paint shaker, a sand mill, a jet mill, a 3-roll mill and a kneader. In the operation, it is possible to add a pigment, a dispersant, a thickener, a leveling agent, an anti-gelling agent and an ultraviolet absorbent.

When the copolymer of the present invention is used for a preparation of thermosetting paint as baking enamel, a curative such as melamine resins, urea resins, polybasic acids, anhydrides thereof, and blocked polyisocyanates can be admixed in the mixing step to use the mixture as a one component coating.

On the other hand, when the copolymer is used for the preparation of a nonthermal curable paint using a nonblocked polyisocyanate, the curative is separately added to form a two component coating. In this case, it is possible to prepare a paint which is nonthermally cured in several hours to several days to form a coated film having desirable characteristics and is usable for about 1 to 10 hours, by selecting the kind of curative and its amount and by controlling a concentration of the copolymer and a content of hydroxyalkyl vinyl ether units in the copolymer.

When the copolymer of the present invention is used as resin for paint it is possible to form under a mild condition, a film having excellent hardness of finish and gloss, flexibility, chemical resistance and stain resistance and weathering resistance. This is effective not only as a baking enamel for precoated galvanized steel, colored aluminum plate and aluminum frames but also as an on-site paintable nonthermally driable paint. The paint effectively applied to the substrate which is not limited to metallic ones but can be inorganic ones such as glass, cement and concrete; organic substrates, for example, plastics such as FRP, polyethylene, polypropylene, ethylene-vinyl acetate copolymer, nylon, acryl polyester ethylene-polyvinyl alcohol copolymer, vinyl chloride and vinylidene chloride and wood materials. The paint is also effective for other specific applications such as aluminum-made swimming pools, colored glass for exteriors and cement tile for roofing.

The present invention will be further illustrated by certain examples and references which are provided for purposes of illustration only and are not intended to be limiting the present invention.

EXAMPLE 1

Into a 200 cc stainless steel autoclave equipped with a stirrer (durable pressure of 25 kg/cm$^2$), 116 g. of t-butanol, 11.7 g. of cyclohexyl vinyl ether (C-HyVe), 11.1 g. of ethyl vinyl ether (EVE), 7.17 g. of hydroxybutyl vinyl ether (HBVE), 0.69 g. of potassium carbonate and 0.06 g. of azobisisobutyronitrile (AIBN) were charged and solidified with liquid nitrogen and deaerated to remove the dissolved air. Then, 36 g. of chlorotrifluoroethylene was charged in the autoclave and the autoclave was gradually heated to 65° C. where a pressure of 4.5 kg/cm² was observed. The mixture was stirred for 7.2 hours until the pressure was reduced to 2.2 kg/cm², when the autoclave was cooled with water to stop the reaction. When the autoclave was cooled to room temperature, the unreacted monomers were purged and the autoclave was opened. The resulting polymer solution was poured into water to precipitate the polymer and then, the polymer was heated and dried and recovered. A yield of the polymer was 35.0 g., a concentration of the polymer was 23.2%, a conversion of the monomers was 53.0%, and an average polymerization velocity was 31.8 g/liter.hour.

The resulting polymer had an inherent viscosity ($\eta$) of 0.39 dl/g. at 30° C. in tetrahydrofuran and a thermal decomposition temperature (initiation of weight loss is observed in air at a temperature rising rate of 10° C./m.) (Td) was 236° C. and a glass transition temperature (DSC at a temperature rising rate of 10° C./m.) of 45° C.

$^{13}$C-NMR spectrum of the copolymer is shown in Figure. According to the analysis of the spectrum, molar ratios of CTFE:C-HyVe:EVE:HBVE were 51.2:17.1:22.5:9.1.

Into a mixed solvent of 4 g. of xylene and 12 g. of methyl isobutyl ketone, 10 g. of the resulting copolymer was dissolved and 4.2 g. of titanium oxide (CR-90 ®) manufactured by Ishihara Sangyo) was added and the mixture was mixed for 1 hour by a paint shaker. The resulting paint showed a good dispersed state (grind gauge:less than 5$\mu$). The paint was admixed with 0.8 g. of hexamethylene diisocyanate, and $1.5 \times 10^{-7}$ g. of dibutyl tin dilaurate and the mixture was coated on a chromate treated aluminum substrate by an applicator. About 7 hours after the application, the finish became tack-free. Three days after, a fast film having a thickness of 20$\mu$ which did not suffer abrased damage by wiping with xylene was obtained. The gloss of the surface was 77% in 60° C.-60° specular reflectance. The finish was submitted to various JIS and other conventional tests. The results are shown in Table 1.

TABLE 1

| Test | Result |
| --- | --- |
| Xylene-rubbing(a) | >200 times |
| Marker stain resistance(b) | hardly stained |
| Cross-cut | 100/100 |
| Cross-cut boiling | 100/100 |
| Scratch Erichsen distensibility (5 mm) | good |
| DuPont Impact (1 kg, ¼" φ) | 50 cm |
| T-bending | 1 T |
| Pencil hardness | 4 H |

Note:
(a)Number of rubs required to abrade the finish off by use of xylene soaked gauge.
(b)Residual stain after wiping off the marker drawing by use of acetone soaked gauze.

EXAMPLE 2

Copolymerization was carried out in accordance with the process of Example 1 except that tetrafluoroethylene (TFE) was used instead of CTFE. The initial reaction pressure was 5.5 kg/cm², which lowered to 2.5 kg/cm² after 5 hours when the reaction was stopped by quenching the reactor. Thirty grams of the copolymer containing 9.5 mole % of HBVE was obtained. The inherent viscosity ([$\eta$]) was 0.45 dl/g. and Tg of 27° C. was observed.

A paint was prepared from the copolymer according to Example 1 and the obtained paint was submitted to the nonthermal cure which proved to complete after 3 days.

EXAMPLES 3 to 6

Copolymerization were conducted in accordance with the process of Example 1, under the conditions listed in Table 2, which also show the reaction results together with some fundamental resin properties ([$\eta$]) Tg and HBVE content).

TABLE 2

| | Exp. 3 | Exp. 4 | Exp. 5 | Exp. 6 |
| --- | --- | --- | --- | --- |
| CTFE | 50 | 50 | 50 | 50 |
| C-HyVE | 25 | 35 | 35 | 15 |
| EVE | 12 | 5 | 10 | — |
| IBVE* | — | — | — | 25 |
| HBVE | 13 | 10 | 5 | 10 |
| Polymerization pressure (kg/cm²) | 4.1 → 2.2 | 4.0 → 2.0 | 4.0 → 2.2 | 4.2 → 2.2 |
| Polymerization time (hr) | 8.0 | 9.0 | 8.0 | 7.0 |
| Polymer yield (g) | 32.0 | 30.0 | 36.5 | 37.7 |
| [$\eta$] (dl/g) | 0.36 | 0.32 | 0.35 | 0.42 |
| Tg (°C.) | 35 | 40 | 45 | 35 |
| HBVE content (mol %) | 12.0 | 9.7 | 4.9 | 9.3 |

Note:
*Isobutyl vinyl ether

EXAMPLE 7

In a 200 cc autoclave made of stainless steel equipped with a stirrer, 120 g. of deoxidized water, 0.6 g. of ammonium perfluorononanoate, 12 g. of trifluorotrichloroethane, 2.2 g. of disodium phosphate and 0.06 g. of ammonium persulfate were charged and then, 10.8 g. of C-HyVE, 10.3 g. of EVE and 6.63 g. of HBVE were charged. The mixture in the autoclave was solidified with liquid nitrogen and deaerated and melted. This was repeated twice and then, 33.2 g. of CTFE was charged.

The autoclave was gradually heated under stirring to 30° C. and the temperature was kept at 30° C. The pressure was 3.5 kg/cm². Three hours after the initiation, the reduction of the pressure was observed. The pressure decreased to about 1 kg/cm² in 9.0 hours after the initiation, and a further pressure drop was not substantially observed. Ten hours after the initiation, the autoclave was cooled with ice water to purge the monomers. The latex obtained in the reactor (concentration of 20.5%) was agglomerated with ethanol and the polymer was filtered, washed and dried to obtain 36 g. of white spongy solid. The conversion of monomers was 66% and the average polymerization velocity was 29 g/l.h. The resulting copolymer had a HBVE content of 8.2 mol %, [$\eta$] of 0.52 dl/g. and Tg of 47° C.

In accordance with the process of Example 1, a paint was prepared by using the resulting polymer and cured at room temperature. The curing characteristics proved suitable for practical use.

EXAMPLE 8

In accordance with the process of Example 1 except using 34.8 g. of sec-butanol and 81.2 g. of t-butanol as a solvent for polymerization and using 0.30 g. of AIBN, a copolymerization was carried out. An initial pressure in the polymerization was 4.4 kg/cm² and the pressure was gradually decreased during the polymerization to reach 0.65 kg/cm² in 13 hours after the initiation. The autoclave was cooled to stop the polymerization. The product was agglomerated by pouring the resulting polymerization solution into water under stirring and washed with methanol and dried at 65° C. under a reduced pressure for 3 hours to obtain 56.6 g. of a copolymer. The average polymerization velocity was 29.3 g/l.h. The copolymer had an inherent viscosity of 0.16 dl/g. and Td of 216° C. and Tg of 43° C. and a formulation of CTFE/C-HyVE/EVE/HBVE of 50.8:16.7:23.0:9.5 (molar ratios).

In accordance with the process of Example 1, a paint was prepared with the copolymer and the paint was coated on an aluminum plate by spraying. As a result, an excellent spraying effect without webbing or sagging was given and the paint was cured at room temperature. The finish had high gloss of 81%.

EXAMPLE 9

In a 260 cc autoclave, 37.0 g. of t-butanol, 145 g. of CTFE, 31.5 g. of C-HyVE, 63.0 g. of EVE, 14.5 g. of HBVE and 0.127 g. of AIBN were charged and copolymerized under the condition of Example 1 at 65° C. for 3 hours to obtain 152 g. of the copolymer. The copolymer had an inherent viscosity of 1.05, Td of 231° C. and Tg of 39° C. and a formulation of CTFE/C-HyVe/EVE/HBVE of 51.2:11.3:34.0:4.5 (molar ratios).

We claim:

1. A curable fluorocopolymer which comprises 40 to 60 mol % of fluoroolefin units, 5 to 45 mol % of cyclohexyl vinyl ether units, 5 to 45 mol % of alkyl vinyl ether units and 3 to 15 mol % of hydroxyalkyl vinyl ether units and has an inherent viscosity of 0.05 to 2.0 dl/g. in tetrahydrofuran at 30° C.

2. The curable fluorocopolymer according to claim 1 wherein said fluoroolefin is perhaloolefin.

3. The curable fluorocopolymer according to claim 2 wherein said perhaloolefin is chlorotrifluoroethylene and/or tetrafluoroethylene.

4. The curable fluorocopolymer according to claim 1 wherein said alkyl vinyl ether has a $C_2$–$C_8$ straight or branched alkyl group.

5. The curable fluorocopolymer according to claim 1 wherein said hydroxyalkyl vinyl ether is hydroxybutyl vinyl ether.

* * * * *